Oct. 3, 1944.   W. W. LOWTHER   2,359,485
CRANK-CASE VENTILATING SYSTEM
Filed Sept. 11, 1939   4 Sheets-Sheet 1
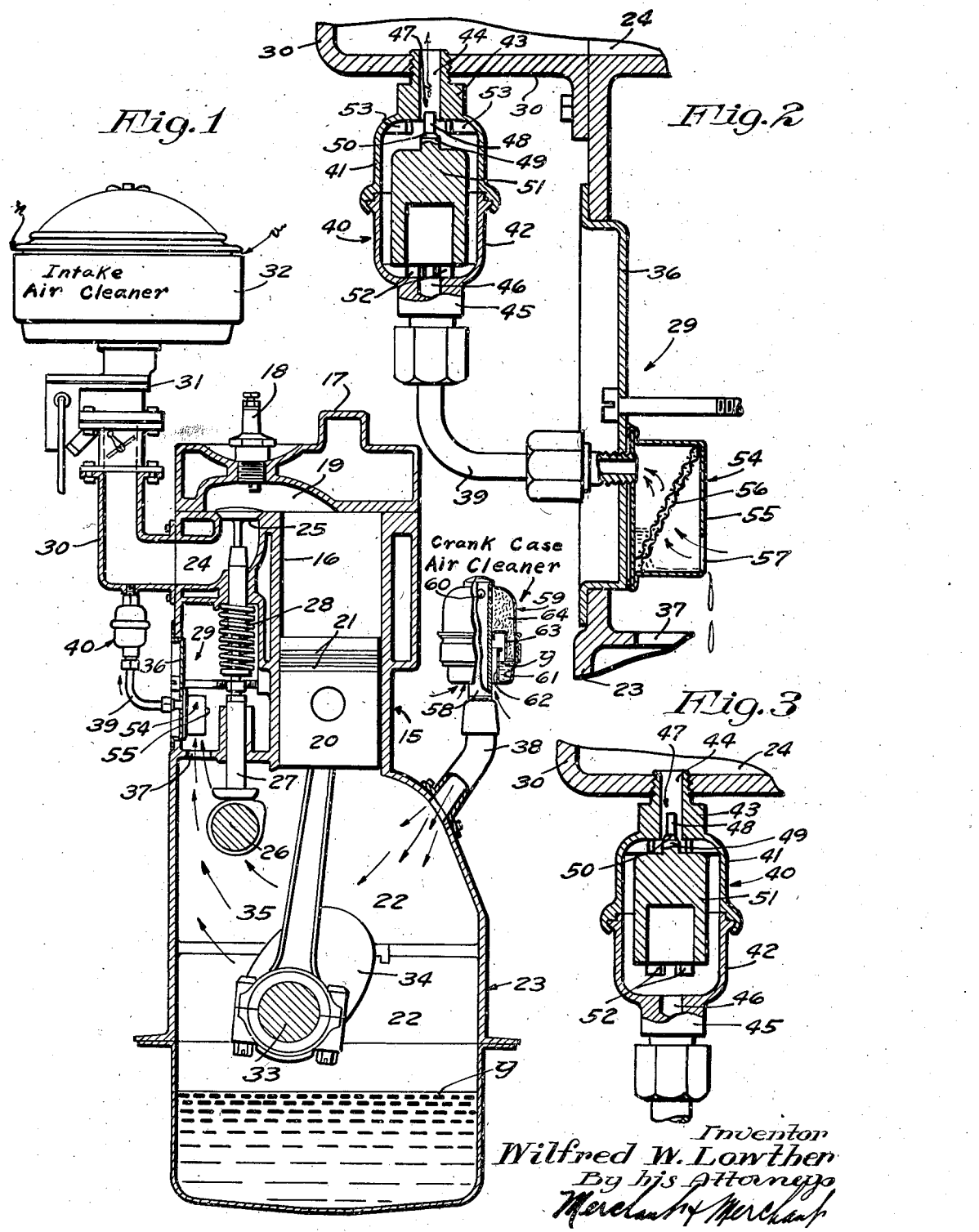
Inventor
Wilfred W. Lowther
By his Attorneys Oct. 3, 1944.   W. W. LOWTHER   2,359,485
CRANK-CASE VENTILATING SYSTEM
Filed Sept. 11, 1939   4 Sheets-Sheet 2
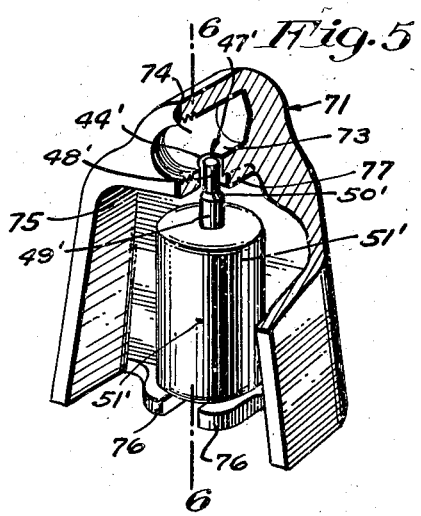
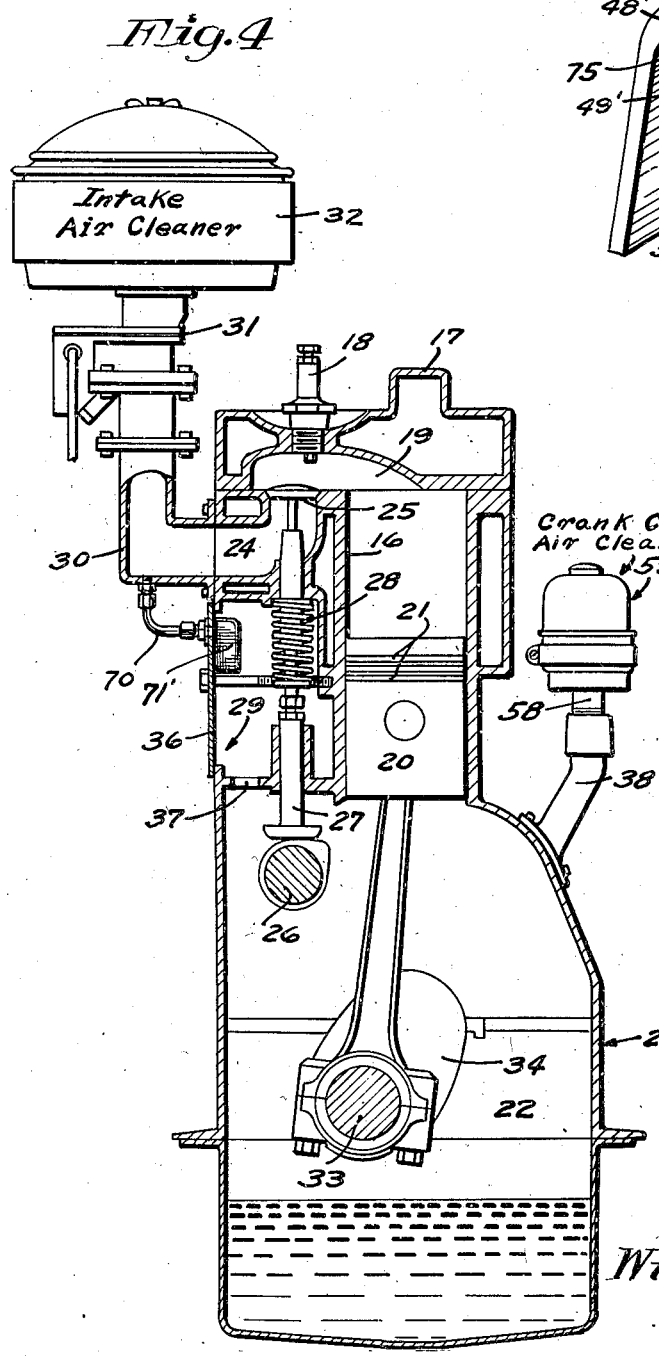
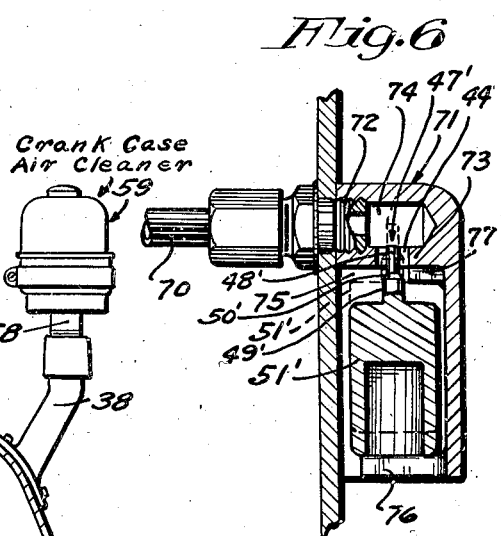
Inventor
Wilfred W. Lowther
By his Attorneys Oct. 3, 1944.  W. W. LOWTHER  2,359,485
CRANK-CASE VENTILATING SYSTEM
Filed Sept. 11, 1939  4 Sheets-Sheet 3

Inventor
Wilfred W. Lowther
By his Attorneys

Oct. 3, 1944.                    W. W. LOWTHER                    2,359,485
                          CRANK-CASE VENTILATING SYSTEM
                            Filed Sept. 11, 1939            4 Sheets-Sheet 4
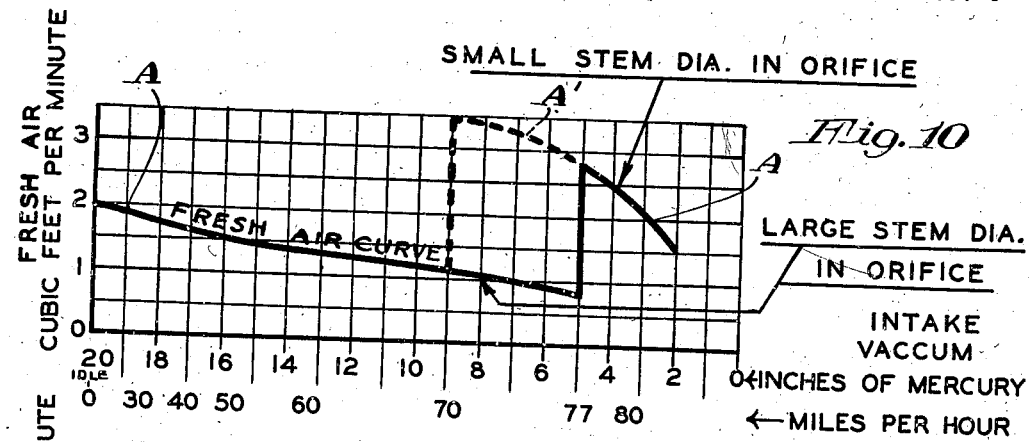
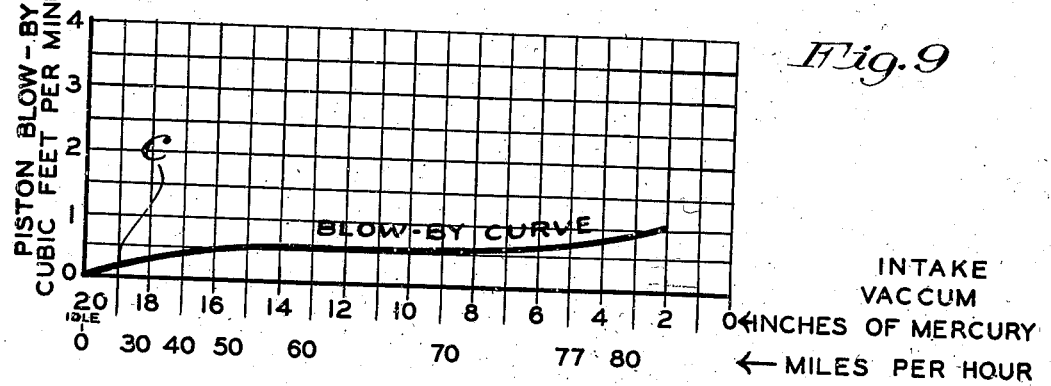
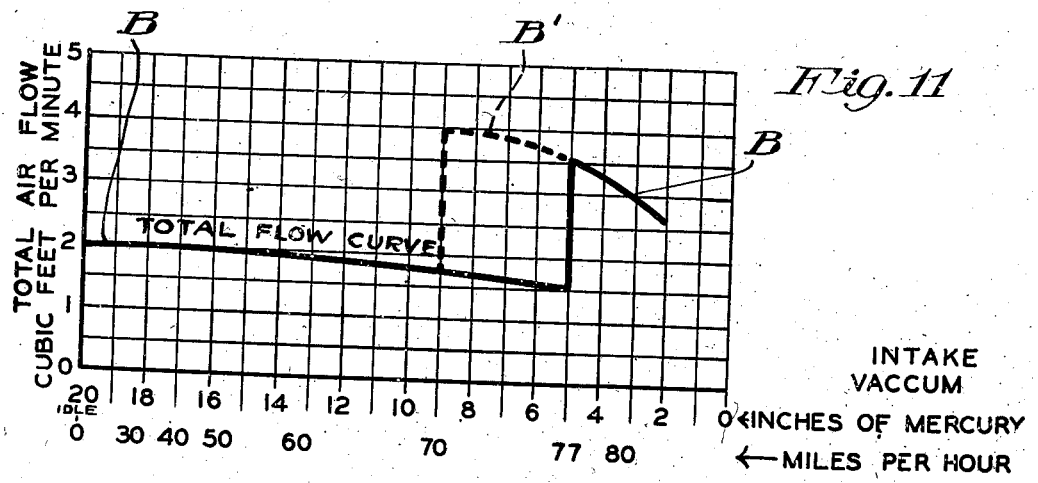
Inventor
Wilfred W. Lowther
By his Attorneys Patented Oct. 3, 1944

2,359,485

UNITED STATES PATENT OFFICE 2,359,485

CRANKCASE VENTILATING SYSTEM

Wilfred W. Lowther, Minneapolis, Minn., assignor to Donaldson Company, Inc., St. Paul, Minn., a corporation of Delaware Application September 11, 1939, Serial No. 294,391

12 Claims. (Cl. 123—119)

My present invention relates to improvements in devices and systems that are particularly adapted for use in controlling the flow of air or gases between two connected chambers of an engine, such as the crank chamber and intake chamber or conduit of an engine, wherein there are maintained varying pressures tending to produce varying flow between the chambers. In some respects the invention is in the nature of an improvement on or modification of the system and structure disclosed in my prior Patent No. 2,120,050 issued to me on June 7, 1938, under the title "Crank case ventilating system."

The present invention has as an important objective the provision of an automatic valve mechanism which, when interposed in a passage between two chambers, such as an engine's crank chamber and intake chamber or conduit, and between which chambers there is maintained a varying pressure differential tending to produce varying flow through the passage, will automatically vary the conducting capacity of the passage responsive to changes in pressure differential between the two chambers, whereby to automatically regulate the flow through the passage.

Another important object of the invention is the provision of a device which, when interposed in a communicating restricted passage between two chambers such as the crank chamber and intake chamber of an internal combustion engine, and in which chambers there is maintained a varying pressure differential tending to produce flow through the passage, will move in the restricted passage responsive to such changes in pressure between the two chambers and as a result of such movement will automatically maintain the restricted passage clean and free of foreign substances tending to clog or restrict the same, and will also automatically regulate the flow of air through the restricted passage under such changing pressures by effectively varying the restriction of the passage.

The importance of keeping crank-cases of conventional types of internal combustion engines well ventilated and the reasons therefor are so well recognized that a detailed explanation appears unnecessary, but it is believed that the following summary of this situation will aid in a complete understanding of the invention.

In internal combustion engines of the variety commonly used in automobiles, trucks, tractors, and the like, the crank chambers, which are usually formed by the crank-cases of the engines and serve also as lubricant reservoirs, are connected to the high compression combustion chambers by cylinders and, although the engine's pistons, which work in the cylinders, are sealed in an attempt to prevent the interchange of gaseous substances between the high compression combustion chambers and crank chambers, there is, nevertheless, an apparently unavoidable leakage or blowing by the pistons into the crank chambers of gases from the high compression combustion chambers. These so-called blow-by gases usually consist of a mixture of burned hydrocarbon gases, unburned hydrocarbon vapor, and water vapor. Such gases, if permitted to linger in the crank chamber of an engine, condense and mix with and contaminate the engine's lubricating oil supply; the condensed hydrocarbon causing oil dilution, and the condensed water vapor presenting a freezing hazard and combining with certain properties of the lubricating oil to produce metal-eating acids. Another serious result of such condensation of blow-by gases is the formation in the crank chamber and other connected parts of the engine, of a foreign deposit known as sludge. It is well kown today that such detrimental condensation of blow-by gases in the crank-cases or chambers can be largely eliminated by provision of a suitable ventilating system which will very rapidly draw off the blow-by gases from the crank chamber before they have had the opportunity to condense and deposit in the lubricant. The general aim in the creation of most ventilating systems has been to provide for, in addition to the rapid withdrawal of blow-by gases, a continuous flow of clean, fresh air through the crank-cases, throughout the greatest possible extent of the load speed operating range of the engine.

There are several methods by which blow-by gases can be rapidly removed from an engine's crank-case and a continuous flow of fresh air through the crank-case maintained throughout more or less of the engine's operating range, and, some thereof, in fact those in connection with which the invention is herein illustrated, includes an outlet connection from the engine's crank chamber to its intake chamber or conduit, in which last named chamber, the predominant pressure is below the predominant pressure in the crank chamber and, hence, results in air and/or gas movement from the crank chamber to the intake chamber. In such ventilating systems the said connection to the intake chamber or conduit is usually made thereto at the point of greatest vacuum or minimum pressure, which, in the case of an engine having a carburetor or other restriction-producing device in the intake, is on the engine side of such restriction-producing device.

In the actual application of crank-case ventilating systems of this type incorporating a connection between the engine's crank chamber and intake duct, and wherein the difference in pressure between the said two chambers tends to maintain a movement of gases and/or air from the crank chamber to the intake chamber, there have hitherto been two serious problems which are as follows:

1. Since, in most internal combustion engines the partial vacuum or sub-atmospheric pressure condition in the intake chamber or conduit is greatest at idle or minimum load and decreases and more nearly approaches that of atmosphere as the load or speed is increased and reaches its minimum at full load or speed, and since the blow-by is least at minimum load or speed when the vacuum in the intake is greatest and increases as engine load or speed increases and vacuum in the manifold decreases, it will be evident that the conducting capacity of the ventilating system passage connecting the crank chamber to the engine's intake should be great enough to handle the maximum volume of blow-by gases, and preferably some fresh air in addition, at full load when the vacuum condition in the intake is the lowest, if the crank-case is to be efficiently ventilated at all speeds from idle or minimum load or speed to full speed or load. Not only does the satisfaction of this requirement require a relatively large passage which will result in the movement of maximum and relatively very much greater than necessary volume of air through the crank chamber at idle and low load, thereby creating an unnecessary load on the air cleaning equipment, but this very high volume of air injected into the engine's intake represents such a large percentage of the total air as to seriously upset the performance and efficiency characteristics of the engine at idle and in the lower load and speed ranges. On the other hand, if the conducting capacity of the passage between the crank chamber and intake be reduced to the point where the total amount of air or gases that are injected into the engine's intake from the crank chamber at idle or low load does not materially effect the engine operating characteristics at low load or speed, the capacity of the ventilating system will usually be far too small to handle the high volume of blow-by gases and efficiently ventilate the crank chamber at high load or high speed when the difference in pressure between the two chambers is lowest.

2. In the application of such systems it has usually been the practice to reduce the conducting capacity of the passage to the point where operating characteristics of the engine at idle and low load and speed would not be unduly upset and this at the sacrifice of efficient crankcase ventilation at the higher speed load ranges. When this was done the second serious problem was encountered, this being the tendency toward clogging of the small passage or orifice by deposits of foreign substances from the blow-by gases and oil vapors.

The device of my prior Patent No. 2,120,050 of June 7, 1938, has proved to efficiently overcome the last named problem, as described under 2 above, but the device of my said prior patent did not in any way alter or improve the objections to and problems in connection with previous systems of this general type, as described under 1 above.

The preferred embodiments of the present invention, as disclosed herein, effectively overcome and eliminate both of the above described problems and objectionable features to systems of this kind. The valve mechanisms of the preferred embodiments of the invention illustrated herein when incorporated in the above described crank-case ventilation connection from the crank-case or chamber to the intake chamber or duct, automatically vary the conducting capacity of this connection responsive to variations in pressure in the intake chamber in such a manner as to automatically maintain the conducting capacity of said connection sufficiently great under all speed and load conditions to carry away all of the blow-by gases and some fresh air in addition thereto and this without at any speed or load condition permitting sufficient air to be injected into the engine's intake to seriously affect the operating characteristics of the engine.

The above noted and numerous other objects and advantages of the invention will be made apparent from the following specification, claims and accompanying drawings. In the accompanying drawings like characters indicate like parts throughout the several views.

Referring to the drawings:

Fig. 1 is a transverse vertical sectional view of a conventional type of internal combustion engine incorporating a preferred embodiment of the invention, some parts on the section line being shown in full and some parts not on the section line being broken away and shown in section;

Fig. 2 is a very much enlarged fragmentary view of certain parts shown in Fig. 1 with some parts shown in full in Fig. 1 broken away and other parts shown in section;

Fig. 3 is a fragmentary sectional view of the valve mechanism of Figs. 1 and 2, but showing the weighted valve element in its upper position as distinguished from the lower position thereof shown in Fig. 2;

Fig. 4 is a view similar to Fig. 1 but showing a slightly modified form of the invention applied to the engine;

Fig. 5 is a perspective view looking at the inside of the valve casing of the form of the invention shown at Fig. 4;

Fig. 6 is a transverse vertical sectional view taken on the line 6—6 of Fig. 5;

Figure 7:
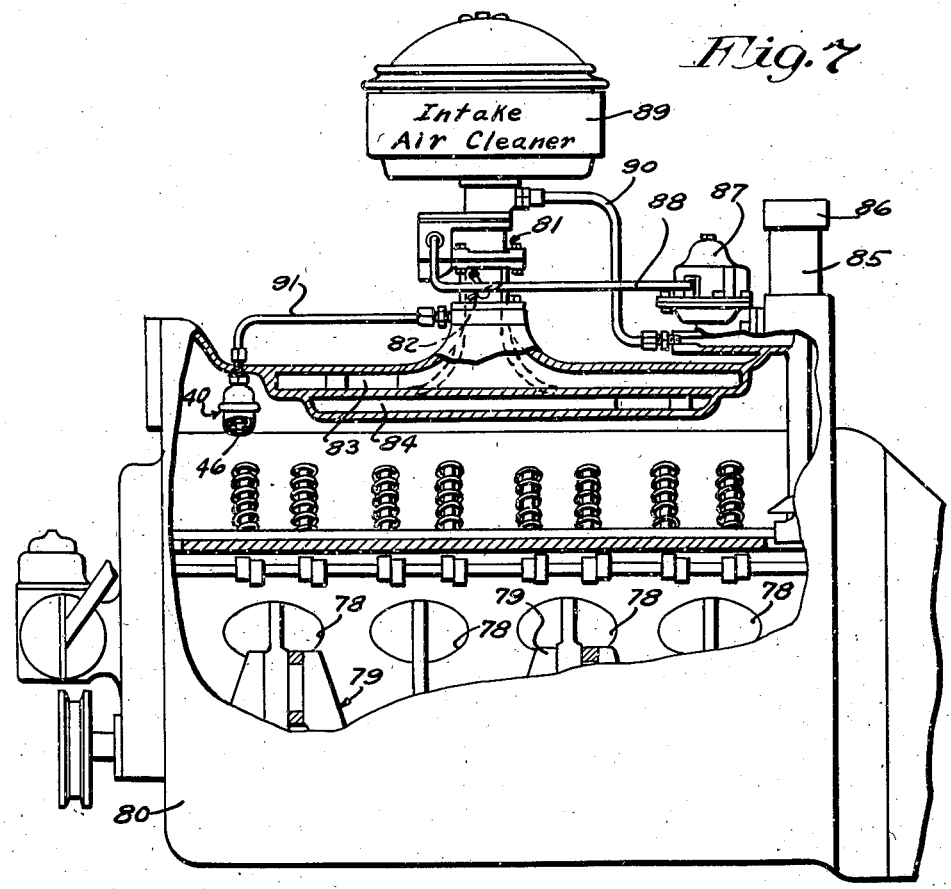
Figure 8:
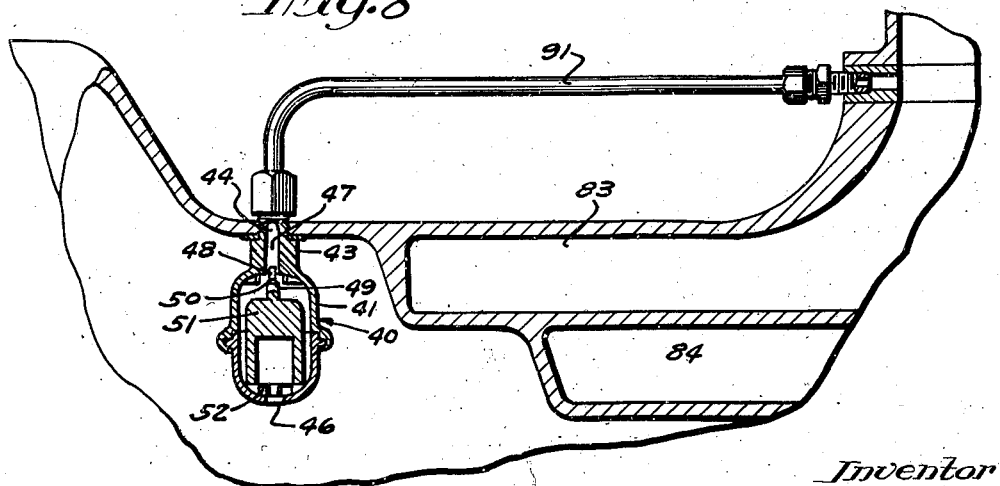

Fig. 7 is a view in side elevation with some parts broken away and some parts shown in section showing one method of incorporating a valve mechanism of the type disclosed in Figs. 1 and 3 inclusive in a V-type eight cylinder engine manufactured by the Ford Motor Company of Dearborn, Michigan, U. S. A.;

Fig. 8 is a fragmentary view illustrating on an enlarged scale certain of the parts shown in Fig. 7;

Figs. 9, 10 and 11 are diagrammatic views wherein attempt is made to graphically illustrate more or less typical examples of certain conditions existing in certain conventional types of automotive engines and the relation to these conditions to the action of the improved crankcase ventilating system, and particularly to the forms thereof disclosed in Figs. 1 to 6 inclusive.

Fig. 9 specifically is a diagrammatic view wherein the varying volume of piston blow-by gases, in cubic feet per minute, entering the crank-case of a typical automobile engine is plotted against intake chamber partial vacuum, in inches of mercury, and engine vehicle speed, in miles per hour.

Fig. 10 specifically is a diagrammatic view wherein the varying volume, in cubic feet per minute, of fresh air entering the crank-case of a typical engine equipped with the forms of ventilating system illustrated in Figs. 1 to 6 inclusive, is plotted against varying partial vacuum conditions in the engine's intake chamber or duct, in inches of mercury, and vehicle speed, in miles per hour.

Fig. 11 specifically is a diagrammatic view wherein the varying volume of total flow of air and gases, in cubic feet per minute, from the crank-case of a typical engine equipped with the ventilating systems of Figs. 1 to 6 inclusive, is plotted against vacuum conditions in the engine's intake conduit, in inches of mercury, and vehicle speed, in miles per hour.

Figs. 1 to 3 inclusive and the form of the invention therein shown will first be described. The engine shown in Fig. 1, and which as previously indicated is of the conventional type used in the automotive, truck and tractor industries, may be assumed to be a conventional multi-cylinder automobile engine. The parts of this engine which are shown in Fig. 1 are indicated by the following numerals, to wit, the cast cylinder block thereof is indicated by 15, a cylinder thereof by 16, a cylinder head by 17, a spark plug by 18, the high compression combustion chamber by 19, a cylinder piston by 20, the piston rings by 21, the engine crank chamber by 22, the crank-case, which forms the chamber 22, by 23, the combustion chamber air and fuel air intake port by 24, a poppet valve controlling the air intake port 24, by 25, a valve-operating cam by 26, the valve-operating tappet by 27, the valve retracting spring by 28, the valve chamber by 29, the engine's intake chamber-forming duct by 30, a conventional carburetor by 31 and an air intake air cleaner by 32.

The air cleaner 32, which is mounted on and forms a continuation to atmosphere of the intake duct 30, may be of any well known type, but may be assumed to be of the type disclosed in my prior Patent No. 2,130,142 of September 13, 1938. Of course, the reciprocating piston 20 is connected to a crank 33 of the engine's crank shaft 34 through the medium of a conventional connecting rod 35. In this engine, as in other internal combustion engines, the piston rings 21 are provided to prevent, insofar as possible, the blowing-by of gases from the high compression combustion chamber 19 to the crank chamber 22. While these rings are comparatively efficient, there is, as previously indicated, even in the best of engines, some leakage by these piston rings and pistons which, if allowed to condense in the crank chamber, will contaminate the engine's oil supply contained in the bottom of the crank chamber and which is indicated by y. Also, in accordance with conventional engine practice, the valve chamber 29 is normally closed by a removable inspection plate 36, and said valve chamber is in communication with the crank chamber 22 through an opening or openings 37. In this engine, as in most conventional engines, the crank chamber is provided with a breather and oil filler pipe 38, which, in the present instance, serves as an air intake pipe or conduit to the crank-case.

The crank-case ventilating system of these Figs. 1 to 3 inclusive includes, in addition to the crank chamber and an air inlet conduit 38, a crank-case outlet conduit 39 extending from the valve chamber 29 to the intake chamber or duct at a point on the engine side of the restriction-producing carburetor 31, and in which chamber there is maintained a predominant but varying partial vacuum or sub-atmospheric pressure condition under engine-operating conditions; such partial vacuum or sub-atmospheric pressure condition being caused, of course, by the suction or intake strokes of the piston or pistons in the engine.

Interposed in and forming part of the conduit 39 is a combined automatic metering valve and restricted orifice clean-out device indicated as an entirety by 40, and presently to be described. This particular embodiment includes a vertically disposed casing of much larger internal diameter than the internal diameter of the balance of the passage 39 on either side thereof, and formed by upper and lower sections 41 and 42 respectively. These casing sections 41 and 42 may be secured together in any suitable manner to provide an air-tight seal therebetween, but, as illustrated, this is accomplished by rolling the flange of the upper section over the co-operating adjoining flange of the lower section.

The upper casing section is formed with an axially projecting externally screw-threaded coupling neck 43 which is screw-threaded through a wall of the intake chamber forming conduit 30 and is provided with a vertically and axially disposed orifice 44 providing communication between the interior of the valve casing formed by sections 41 and 42 and the intake chamber. The lower casing section is formed with a coupling neck 45 having a vertically and axially disposed intake passage or orifice 46. The portion of the conduit 39 between the valve chamber coupling neck 45 and the valve chamber is, in this instance, in the nature of a copper tubing connected to the neck 45 and valve chamber cover respectively by conventional couplings.

Working axially in the valve orifice 44 is a valve stem 47 having a relatively small diameter upper end portion 48, and a relatively large diameter lower portion 49, which relatively large and small diameter portions are preferably, and as illustrated, connected by an intermediately tapered portion 50. This valve stem 47 is preferably, and as shown, weighted at its lower end and this, in accordance with the present example, is accomplished by die casting the stem 47 integrally with a relatively large diameter weight 51, having circumferentially spaced feet 52 which permit the weight to rest upon the bottom of the valve chamber without closing the intake orifice 46 thereto. Under changing pressure relations or pressure differentials between the crank chamber 22 and the engine's intake chamber, the weighted valve stem will move back and forth between the lower positions shown in Fig. 2 and the upper position shown in Fig. 3, it being noted that the weight is held in spaced relation to the upper end of the valve chamber by circumferentially spaced stop flanges 53 that are formed on the interior of the valve casing section 41 and prevent the weight itself from restricting the orifice or passage 44. Of course, in a static or inoperative condition of the engine, the weighted valve stem will always be in its lower position shown in Fig. 2.

Preferably, and as shown, the weight 51 is cored out to provide a downwardly opening recess adapted to receive additional weighting substance such as solder for the purpose of bringing about any desired balance. Of course, it will be understood that under the higher conditions of vacuum in the engine's intake, the weighted stem will be lifted to its uppermost position wherein the largest diameter portion of the stem is within the lower portion of the passage, but that the weighted stem will drop when the vacuum condition is reduced to some given point so that only the reduced diameter end portion 48 will be within the passage or orifice 44. Even the large diameter portion 49 of the stem fits in the orifice 44 with some clearance so that although the restriction of the passage is greatly increased when the large diameter of the stem is in the passage, there will still be a considerable leakage of air therearound. Since the small diameter end portion of the valve stem is always projected into the orifice 44 to a greater or lesser extent, said reduced diameter end serves as a pilot to guide the larger diameter portion of the stem into the orifice, and the wobbling of the stem in the orifice and the axial movements thereof in the orifice will maintain the orifice and valve stem clean and free of foreign substances which tend to collect on and eventually plug a small diameter orifice having very low conductive capacity. Because the valve 40 is incapable of completely closing the restricted passage to passage of air, it may be hereinafter referred to as a non-closing valve.

Since there is a very violent agitation of oil within the crank chamber and even in the valve chamber at the point of entry of the conduit 39, the air and gasses drawn out of the crank and valve chambers through the conduit 39 are apt to contain oil vapors or particles in suspension unless some means be provided to separate this oil from the air and gases. For the purpose of removing such oil vapors or particles from the air and gases before they are extracted from the crank chamber, I preferably provide, in connection with the form of the invention shown in Figs. 1 to 3, an oil trap indicated as an entirety by 54. This oil trap 54, as illustrated, comprises a rectangular casing 55 containing a super-imposed pair of diagonally disposed oil condensing screens 56 which divide the interior of the casing into two chambers. The relatively small diameter conduit 39 opens into the upper portion of the outer chamber and air is taken into the lower portion of the inner of said chambers through an intake aperture 57. In operation air and gases from the crank chamber which contain oil vapors and mist will enter the opening 57 at relatively high velocity due to the relatively small diameter of the passage, but will expand within the inner chamber and have their velocity greatly retarded. These gases, when passing through the fine mesh screens 56 at low velocity, will deposit the oil mist and vapors carried thereby on the screens and then pass out of the outer chamber at greatly increased velocity through the conduit 39. The oil condensed upon the screens will flow down to the bottom of the casing 54 and out the opening 57 back into the crank and valve chambers. This oil trap, while not essential in all cases, is recommended wherever air is taken out of the crank chamber at relatively high velocity at a point where oil is in suspension, since its use will result in a material saving of oil, which would otherwise be wasted.

Of course, one of the requirements for a truly satisfactory crank-case ventilation system is the removal of all abrasive foreign substances from the air before it is taken into the crank-case, and for this purpose I have equipped the breather pipe 38 of Fig. 1 with an air cleaner of the type disclosed in my co-pending application S. N. 294,886, although many other types of air cleaners might be used with more or less success for this purpose. The particular air cleaner described comprises an axial air outlet pipe 58 and a shell-like casing 59. The casing is mounted on and closes the upper end of the intake tube 58, which in turn is detachably applied to the breather pipe 38 to provide communication between the upper end of the pipe 58 and the annular upper portion of the casing 59. The pipe 58 is provided with a series of ports or holes 60. The base portion of the casing 59 is formed to afford an annular oil reservoir 61 and an upwardly opening annular air intake passage 62 surrounding the pipe 58. Preferably anchored to the center portion of the pipe 58 is a radially and downwardly projecting skirt 63 which forms a downwardly directed annular continuation of the passage 62. The annular space within the casing 59 radially outward of and directly above the skirt 63 is preferably filled with a suitable air-pervious filtering medium such as metallic wool, crinkled wire, or the like, 64. This air cleaner identified on the drawings as "Crank-case air cleaner" is of the so-called "oil bath" type and thoroughly cleanses the air before it is admitted to the crank case. In the first place air entering the reversely curved annular air intake passage 62 impinges upon the oil $y$ in the reservoir 61 and deposits most of the foreign substance and all of the heavier particles carried thereby in the oil. The air then reverses its direction of travel and passes upwardly through the filter and into the outlet pipe 58. A large percentage of oil from the reservoir 61 is displaced and carried upwardly into the filtering medium so that all of the dust which enters the filter will be removed in the course of its passage therethrough.

*Summary of operation of Figs. 1 to 3*

If, for the purpose of example, we assume that the engine of Fig. 1 has the intake conduit vacuum characteristics and piston blow-by characteristics exemplified in Fig. 9, and that the valving device of Figs. 2 and 3 has certain approximate dimensions and weights hereinafter given, for the purpose of example, the apparatus of Figs. 1 to 3 will function substantially as follows, to wit: As soon as the engine is started, the pressure in the engine's intake on the engine side of the carburetor will drop from atmospheric pressure to a partial vacuum or sub-atmospheric pressure of approximately 20 inches of mercury, as measured by a mercury manometer, while the pressure in the crank-case will remain very close to atmospheric pressure, there being, however, a slight vacuum built up in the crank case as a result of the small restriction set up by the crank case air cleaner. As a result of this low pressure or high vacuum condition on one side of the weighted valve stem and the relatively high pressure on the other side thereof, the weighted valve stem 47 will rise from its lower position shown in Fig. 2 to its upper position shown in Fig. 3, at which time the larger diameter portion 49 of the valve stem will be in the orifice. With the valving orifice 44 thus restricted, the conducting capacity of the passage will be reduced to approximately 2 cubic feet per minute when there is approximately 20 inches of mercury in the engine's intake, as at idle (see left-hand end of curves A and B, Figs. 10 and 11 respectively) and this conducting capacity, while far in excess of what is necessary to carry away the piston blow-by gases from the crank chamber and satisfactorily ventillate the same when piston blow-by is nearly negligible or close to zero (see curve c, Fig. 9), is, nevertheless, not great enough to seriously effect the idling characteristics of the engine. In fact, this 2 cubic feet of air or gases represents about the maximum that can be bled into the intake of many engines at idle and fully compensated for by carburetor adjustment. Of course, as engine speed or load increases from idle, the vacuum in the engine's intake is progressively decreased, while at the same time, the rate of blow-by into the crank chamber is more or less progressively increased, which means that the rate of conductivity of the ventilating system will be decreased, while the demand thereon is being increased. However, by reference to Fig. 9, it will be seen that the rate of piston blow-by does not exceed approximately one cubic foot per minute at any steady or constant load as measured, for example, by car speed from zero to maximum, and is less than three-fourths (¾) cubic foot per minute at 77 miles per hour car speed, at which time the vacuum in the intake duct has fallen off from 20 inches of mercury to 5 inches of mercury. At this point attention is directed to full line curve A of Fig. 10, from which it will be seen that even at this point where intake vacuum has fallen off to 5 inches of mercury and the blow-by is at about three-fourths (¾) cubic foot per minute, the rate of conductivity through the ventilating system, while greatly reduced from idle, is still sufficient to take in fresh air to the crank chamber through the crank case air cleaner and breather 38 at a rate of well over three-fourths (¾) cubic foot per minute; and this is in addition to carrying away blow-by gases at their now high rate of entry into the crank chamber of slightly over three-fourths (¾) cubic foot per minute. The varying total flow, including fresh air and blow-by, from the crank chamber and through the orifice 44 under the maximum restriction offered by the large diameter portion 49 of stem 47 at different engine loads as measured by car speeds from zero miles per hour to 80 miles per hour and at varying intake vacuums from 20 inches of mercury down to below 2 inches of mercury, is shown by full line curve B of Fig. 11, which curve is a composite of curves C and A respectively of Figs. 9 and 10.

Under the combined action of the pressure differential between opposite sides of the large diameter portion of the valve stem 47 and the upward impact against the bottom of weight 51 of air entering the valve casing through orifice 46, the weighted valve stem 47 will remain in its upper maximum restricting position until the intake vacuum drops to 5 inches of mercury, which condition will be reached at an engine load brought about by a steady car speed of approximately 77 miles per hour, but at this point the weighted valve stem will drop to its lower position shown in Fig. 2. When this happens, the restriction of the orifice 44 will be greatly decreased, and the total conducting capacity increased from about three-fourths (¾) cubic foot per minute at an intake vacuum of 5 inches of mercury, to something over three and one-half cubic feet per minute, as indicated by the vertical portion of the full line curve B of Fig. 11. This great increase in conducting capacity of the ventilating system brings the total conducting capacity thereof greatly above that which is necessary to satisfactorily ventilate the crank-case at the rate of piston blow-by existing at this point; but this great increases is desirable to take care of the further falling off of intake vacuum and the further increasing of blow-by at engine loads above this point. However, even this relatively great rate of entry of air and gases into the engine's intake after carburetion represents such a small portion of the total flow in the intake under this high load condition as to be of little or no consequence in most cases and is readily compensated for by carburetor adjustment in most any automobile engine. By reference to those portions of Figs. 9, 10 and 11 lying to the right of the vertical lines representing 5 inches of mercury, it will be seen that whereas the vacuum decreases and blow-by increases under further engine load, that the gradually diminishing rate of conductivity through the ventilating system, with relation to the increased rate of blow-by, remains at all further increased engine loads above the low point reached at 5 inches of mercury vacuum in the intake. When engine load is decreased from maximum or from any point where intake vacuum is above approximately 5 inches of mercury back to approximately 5 inches of mercury intake vacuum, the weighted valve stem 47 will again rise to the position shown in Fig. 3 wherein maximum restriction of the orifice 44 is provided by the large diameter portion 49 of the stem 47.

Now it is important to note that this lifting of the weighted valve stem 47 to its upper position, at approximately the same manifold vacuum condition at which it dropped under increased load, and decreased vacuum, is brought about, as previously indicated, by the combined action of vacuum lift on the small diameter portion 48 of the valve stem 47 on one hand, and high velocity impingement against the bottom of the valve stem weight 51 of air entering the valve chamber through orifice 46, on the other hand. In the absence of the lifting action of the high velocity air stream directed against the bottom of weight 51, the weighted valve stem would not be lifted to its upper position at the same vacuum condition in the intake which resulted in dropping thereof to its lower position, due to the increased cross-sectional area of the valve stem subject to vacuum or pressure differential when the stem is in its upper position, as compared to the reduced diameter in the valve orifice when the stem is in its lower position. From this it will be obvious that depending upon vacuum or pressure differential alone a much greater vacuum or pressure differential will be required to lift the weighted valve than to hold the same in lifted position wherein the large diameter portion of the valve stem is in the orifice and subject to vacuum or pressure differential. In fact, it is found that if the lower section of the valve chamber be provided with a very large air flow orifice of a diameter, for instance, approximately equal to the diameter of the weight 51, the velocity of air enttering the valve chamber will be so low as to provide no effective lift on the weighted valve stem, and under these conditions, the weighted valve stem will still drop at 5 inches of mercury, as indicated by vertical portions of full line curves A and B, but would not rise under decreasing engine load until the vacuum in the engine's intake had built up to approximately 9 inches of mercury, as indicated by dotted lines A' and B' of Figs. 10 and 11 respectively. It may be said that the velocity of air through the orifice 46 of the valve chamber is so low at 5 inches of mercury with the valve orifice 44 restricted to its maximum, by the upper position of the valve, as to be of practically no consequence insofar as its lifting action on the weighted valve stem is concerned, but that the velocity of air through the orifice 46 at an intake vacuum of 5 inches of mercury with the valve in its lower minimum orifice-restricting position is sufficiently high to have a very considerable lifting action on the weighted valve stem. This combining of the action of pressure differential and air velocity in lifting the valve stem at approximately the same vacuum condition at which it was dropped, is very important in that the problem of adjusting the carburetor to compensate for air bled into its intake under different load conditions is much simpler when the rate at which air is bled into the intake under any particular engine intake vacuum condition is always the same. It will be appreciated that it is difficult to adjust the carburetor to properly take care of different rates of air bleeding into the intake in any particular intake vacuum range. Of course, by varying the diameter of the orifice 46, the exact manifold vacuum at which the weighted valve stem will be raised can be somewhat varied and in practice it has been found desirable to effect this raising just slightly, say one-fourth to one-half inch of mercury, below the point at which the weighted valve stem was dropped.

It should be appreciated that the relation of piston blow-by and intake vacuum to engine load, the latter as measured by car speed, is illustrated in Figs. 9, 10 and 11, on the presumption of steady throttle and even steady car speed, but that these will vary considerably under engine acceleration during which time the manifold vacuum might drop to 5 inches of mercury, for example, at 20 miles per hour more or less, and, of course, under these conditions the piston blow-by will increase materially with relation to car speed. The weighted valve stem, however, in all events, will rise and fall at approximately the same point which, in accordance with the present example, is approximately 5 inches of mercury intake vacuum.

It might be stated that in engines wherein the intake vacuum and piston blow-by characteristics are approximately as represented in the diagrammatic view Fig. 9, the crank-case ventilating characteristics illustrated in Figs. 10 and 11 may be closely approximated by making the valving device according to the following specifications:

Total weight of weight 51, including valve stem 47, approximately 35.5 grams;
Diameter of orifice 44 approximately two hundred and twenty thousandths of an inch (.220");
Diameter of portion 48 of valve stem 47 approximately one hundred forty-five thousandths of an inch (.145");
Diameter of stem portion 49 approximately two hundred thousandths of an inch (.200");
Diameter of orifice 46 approximately seven thirty-seconds of an inch ($\frac{7}{32}$").

By slight variations in the measurements given approximately the ventilating system performance characteristics indicated in the diagrams can usually be obtained in the average run of automotive engines on the market at this time. It should be understood that I do not intend to limit myself in any way to such specific measurements, weights, etc., as are herein given purely for the sake of example, but have chosen to do so merely as an aid to anyone endeavoring to practice this form of the invention.

Such experiments as I have conducted to this date indicate that maximum efficiency of crankcase ventilation is obtained by taking into the crank-case fresh air at a rate at least equalling the rate at which blow-by enters the crankcase, under all engine load conditions. By reference to the diagrams Figs. 9 to 11, it will be seen that this requirement is exceeded under all conditions indicated. This means that there is a large safety factor allowing for great increase of blow-by as a result of engine wear.

*Description of Figs. 4, 5 and 6*

In Fig. 4 the engine, being identical to the engine shown in Fig. 1, is indicated by like characters. Also, the breather pipe 38 of the engine of Fig. 4 is equipped with a crank-case cleaner of the same character as shown in Fig. 1. The crank-case ventilating system of Figs. 4 to 6 inclusive represents, however, a slightly different form of the invention, of which certain parts are identical to those of Figs. 1 to 3 inclusive, and such identical parts of the ventilating system will be indicated by like numerals plus the prime mark. This form of the ventilating system also includes a connection from the crank and valve chambers through the valve chamber cover plate 36 and extending to the engine's intake duct or chamber 30. This ventilating system conduit is indicated by 70 and is in the nature of a copper tubing. In this form of the invention the valve casing, which is indicated by 71, is a one piece affair open at its bottom and one side and attached to the valve chamber cover 36 by screw threading the upper end portion of the same on to the inwardly projected screw-threaded end of a coupling 72 of the conduit 70. Below the point of entry of the coupling 72 into the valve casing, the interior of the valve casing is provided with a transverse partition 73 that divides the interior of the casing into an upper chamber 74 and a lower chamber 75. The partition 73 is provided with an orifice 44' which may be assumed to correspond to the valving orifice 44 of Figs. 2 and 3. A weighted valve stem 47', which may be assumed to be identical to the one shown in Figs. 2 and 3, co-operates with the orifice 44' in the same manner as does the weighted valve stem 47 of Figs. 2 and 3 with the orifice 44 of Figs. 2 and 3. The weighted end of the valve stem 47' is limited against downward axial movements by stop flanges 76 and is limited against excessive upward movements by stop lugs 77.

In this form of the invention the valve casing 71, which is located within the valve chamber and has one side thereof formed by the valve chamber cover 36, forms in itself a satisfactory oil trap, since the bottom of the valve casing is so nearly completely open that the velocity of air entering the valve casing is so low that such oil spray or mist as may be in the air at that time will be dropped out before the air velocity is increased through the restricted orifice 44'. However, this absence of high air velocity at the point of entry to the casing below the weighted valve stem, while offering the advantage of eliminating the necessity or even desirability of an additional oil trap, such as shown at 54 in Fig. 2, is devoid of the advantage pointed out in connection with the device in Figs. 1 to 3, of having a high velocity air stream available to aid in raising the weighted valve stem at approximately the same vacuum condition at which it was dropped. In this form of the invention the operation will be substantially identical to the operation of the device of Figs. 1 to 3 under increasing engine load and decreasing intake vacuum, the weighted valve stem dropping at approximately 5 inches of mercury intake vacuum. However, in this form of the invention the weighted valve stem, instead of rising when the vacuum in the intake is reduced back to the point at which the weighted valve stem was dropped, will be retained in its lower position until the intake vacuum has built up to approximately 9 inches of mercury, as indicated by dotted line curves A' and B' of Figs. 10 and 11.

*Description of Figs. 7 and 8*

In Figs. 7 and 8 substantially the same form of orifice clean-out and air flow metering device, as is shown in Figs. 1 to 3, is illustrated as being incorporated in a ventilating system of the type broadly covered by my prior United States Patent No. 2,060,883 entitled "Crankcase ventilating system," and which was issued November 17, 1936. In these Figs. 7 and 8 the combination clean-out and metering device is shown as embodied in the ventilating system of my last noted prior United States patent, more or less as a substitute for the clean-out devices of my prior United States Patent No. 2,120,050 of June 7, 1938, my prior patent of the Dominion of Canada No. 378,550 of Dec. 27, 1938, and British Patent No. 497,888 of March 23, 1939, issued to the Donaldson Co., Inc., of St. Paul, Minnesota. The particular engine incidentally illustrated in Figs. 7 and 8 being of the well known 8 cylinder V-type manufactured by the Ford Motor Co. of the United States for use in connection with automobiles, trucks, and the like, will be briefly described as follows. The cylinder block of the engine includes angularly disposed cylinder banks each containing 4 cylinders 78. The crank shaft of this engine is indicated as an entirety by 79, and the crank-case, which provides a crank chamber serving also as an oil reservoir, is indicated by 80. The carburetor, indicated by 81, is of the well known double Venturi tube type and is provided with a throttle valve 82 for each of said Venturi tubes. The carburetor is connected to the engine's cylinders through an integrally formed pair of intake chamber-forming manifolds 83 and 84, each of which manifolds extends from an opposite Venturi tube and distributes the explosive mixture to an opposite bank of cylinders 78. The manifolds 83 and 84 are integrally formed in a plate that extends between opposite cylinder block sections and serves to close the upper portion of the crank-case. For the purpose of this particular adaptation of this invention to the engine, the oil filler or breather pipe 85, which opens into the upper portion of the crank-case, is closed by a cap or the like 86. The engine's fuel pump is indicated by 87, and the fuel supply line from the pump to the carburetor by 88. The carburetor intake is connected to atmosphere in this instance through an air cleaner 89 which may be of any well known type, but for the purpose of this case, may be assumed to be of the type disclosed in my prior United States Patent No. 2,130,142 of Sept. 13, 1938. In this particular type of ventilating system the drawing off of blow-by gases from the crank-case and the circulation of fresh air through the same is effected by making independent circulating connections from the engine's crank chamber to the engine's intake at points therein between which there is maintained a pressure differential under engine operating conditions. In accordance with the instant example this is accomplished by extending a conduit 90 from one end portion of the crank-case to the engine's air intake at the atmosphere side of the carburetor, but preferably at the engine side of the air cleaner, and making another connection from the other end portion of the crank-case to the engine's intake at a point on the opposite or engine side of the carburetor. This last named connection is in the nature of a conduit 91. The conduit 90 makes its connection to the crank-case through the base of the fuel pump, whereas the conduit 91 makes its connection to the upper rear portion of the crank-case through the crank-case cover plate in which the manifolds 83 and 84 are formed. The throttle valve-equipped carburetor 81 does, of course, produce a very considerable restriction to air flow through the engine's intake, which restriction varies with throttle valve position and is greatest when the throttle valves are closed to the maximum and is at its minimum when the throttle valves are in their wide open positions. In the engine of Fig. 7 since the crank-case or chamber is sealed except for the conduits 90 and 91 to the intake, the pressure differential at opposite sides of the carburetor will cause a movement of air out of the engine's intake through conduit 90 into the crank chamber through the crank chamber and out of the crank chamber back to the intake through conduit 91. With this arrangement the crank chamber will, of course, be maintained at more or less of a sub-atmospheric pressure. Of course, the tendency to circulate through the crank-case will be greatest when the engine is operating at idle or low load when the throttle valve is nearly closed, and will be gradually reduced as the throttle valve is opened.

Of course, the system thus far described is virtually the ventilating system of my prior Patent No. 2,060,883. However, in accordance with the example of Figs. 7 and 8, I have very materially improved the ventilating characteristics of this system by incorporating, at the point of outlet from the crank chamber to conduit 91, a combination clean-out and valving device of the type shown in Figs. 1 to 3. This valving device is indicated by characters corresponding to the characters assigned thereto in Figs. 1 to 3. In this arrangement, as in the other arrangements described, the weighted valve stem normally rests on its lower position wherein the smallest diameter portion of its stem is in the valving orifice, but when the engine is started, the relatively very much lower pressure in conduit 91 than in conduit 90, will result in the weighted valve stem immediately rising to its upper maximum orifice-restricting position. The weighted valve stem will stay in this upper maximum restricting position until some point is reached in the operation of the engine where the pressure differential between conduits 90 and 91 is reduced to a point where it is no longer sufficient to hold the weighted valve stem in suspense. At this point, of course, the weighted valve stem will drop and the orifice will be open to a degree which will result in much more rapid circulation of air through the crank-case at the then greatly reduced pressure differential. By properly proportioning the diameters of the valve stem and valving orifice, and by properly balancing the weight of the valve stem, the conducting capacity of the orifice can be increased and decreased as desired, and the characteristics of the ventilating system will be greatly improved over and above the ventilating system of my prior United States Patent No. 2,060,883. It may be said that whereas the ventilating system of my last noted prior United States patent was very efficient at low speeds or loads, that its efficiency dropped off quite seriously under very high loads, and this condition is very largely overcome by incorporation of the metering device described which will operate to automatically increase the conducting capacity of the outlet orifice under high load low pressure differential conditions.

It will be appreciated that in all of the forms of the invention described, the weighted valve stems are yieldingly biased downwardly by gravity.

In accordance with the patent statutes I have described what I presently believe to be the best embodiments of the invention, but I do not wish to be understood thereby as limiting myself or the scope of the invention, as many changes and modifications may be made without departing from the spirit of the invention; all such I aim to include in the scope of the appended claims.

In carrying out the invention the ventilating conduits to and from the restricting orifice 44 should be of large enough diameter to provide greater conducting capacity at either side of the orifice 44 than the maximum conducting capacity of orifice 44 in either position of the valve stem.

What I claim is:

1. The combination with an internal combustion engine having a crank-case, and an intake wherein there is a varying degree of pressure with respect to that of the crank-case under operating conditions, of a crank-case ventilating system including a duct extending from the said intake to the crank-case and having a restricted passage, and a combined metering valve and clean-out device working in the restricted passage and subject to movement under pressure variations in the intake, said metering valve and clean-out device keeping the restricted passage free of foreign substance and open to passage of air in all of its axially moved positions and comprising a multiple diameter stem working axially through at least one end of the restricted passage to variably restrict the same, all parts of the multiple diameter stem that work in the resirtcted passage being of less diameter than said restricted passage, said multiple diameter stem being free for lateral wobbling movements in the restricted passage limited only by engagement of the stem with the walls of the restricted passage, and means for limiting axial movements of said stem.

2. The combination with an internal combustion engine having a crank-case, and a combustion chamber air intake wherein there is a varying pressure with respect to that of the crank case under engine operating conditions, of a crank-case ventilating system including a conduit extending from the intake to the crank-case and incorporating a substantially vertically disposed restricted passage, and a combined metering valve and clean-out device keeping the restricted passage free of foreign substance and open to passage of air in all of its axially moved positions, said metering valve and clean-out valve being in the nature of a weighted stem working axially through at least one end of the restricted passage, and means for limiting axial movements of the stem in the restricted passage under pressure variations in the intake, all portions of the stem that are movable into the restricted passage being of less diameter than that of any part of the restricted passage in which the stem operates and said stem being free for lateral wobbling movements in the restricted passage that are limited only by engagement of the stem with the walls of the restricted passage, there being a plurality of diameter differences between the stem and cooperative restriction-producing portion of the passage to thereby variably restrict said passage under axial movements of the stem.

3. The structure defined in claim 2 in which the combined metering valve and clean-out stem is provided outwardly of the restricted passage with an enlarged weight-acting end the total weight of which, weight-acting end, greatly exceeds the weight of that portion of the stem that works in the restricted passage, the overall weight of the stem being so proportioned with respect to the varying lifting action produced thereon under such pressure variations in the intake as are frequently encountered during normal engine operation that the stem will be raised and lowered between its axial limits frequently during normal engine operation.

4. The structure defined in claim 2 in which the metering valve and clean-out stem works through the bottom of the restricted passage and is provided below the stem-restricted passage with an enlarged weight-acting head, which head greatly exceeds the total weight of the stem thereabove, the overall weight of the stem being so proportioned with respect to the varying lifting action produced thereon under such pressure variations in the intake as are frequently encountered during normal engine operation that the stem will be raised and lowered between its axial limits frequently during normal engine operation.

5. The combination with an internal combustion engine having a crank-case and having a combustion chamber air intake duct wherein there is maintained a varying degree of pressure with respect to that of the crank-case under engine operating conditions, of a crank-case ventilating system including a conduit extending from the engine's intake to the crank-case and incorporating a substantially vertically disposed restricted passage, a combined metering valve and clean-out device in the nature of a weighted stem arranged to work axially through one end of the restricted passage, there being a plurality of diameter differences between the stem and cooperative restriction-producing portions of the passage to thereby variably restrict said passage under axial movements of the stem, said stem being subject to varying lifting action produced thereon as a result of varying pressure in the intake and being free for lateral wobbling movements in the restricted passage that are limited only by engagement of the stem with the walls of the restricted passage, and means for limiting axial movements of the metering valve and clean-out stem in the restricted passage under pressure variations in the intake, the maximum diameter part of the stem that works in the restricted passage being of less diameter than that of any part of the restricted passage in which the stem operates, and said stem being so weighted that it will be raised and lowered between its axial limits of movement responsive to such pressure variations in the engine's intake as are encountered under engine operating conditions.

6. The structure defined in claim 5 in which said metering valve and clean-out stem is provided outwardly of one end of the passages with a weight-acting head that greatly exceeds the weight of the balance of the stem.

7. The combination with an internal combustion engine having a crank-case and an intake wherein there is a varying degree of pressure under operating conditions, of a crank-case ventilating system including a restricting passage connecting said intake to the crank-case, and a reciprocatory non-closing metering valve working in said restricting passage and subject to movement under pressure variations in the intake, said metering valve comprising a stem axially movable in the restricting passage and operating through said passage to keep the same free of foreign substance and open to the passage of air in all its axially movable positions, the stem of said metering valve having different diameters for variably restricting the passage under different axially-moved positions of the stem in the passage, said stem being subject to movement under pressure variations in the intake to decrease the conductive capacity of the restricting passage responsive to maximum pressure difference between the intake and crank case and to increase the conductive capacity of the restricting passage responsive to maximum pressure difference between the intake and crank case, and means for limiting the axial movement of said stem, said stem being free for lateral wobbling movements limited only by engagement of the stem with the walls of the restricted passage.

8. The combination with an internal combustion engine having a crank-case and an intake wherein there is a varying degree of pressure with respect to crank-case pressure under operating conditions, of a crank-case ventilating system including a restricting passage connecting said intake to the crank-case, and a reciprocatory non-closing metering valve working in said restricting passage and subject to movement under pressure variations in the intake, said metering valve comprising a stem axially movable in the restricting passage and operating through said passage to keep the same free of foreign substance and open to the passage of air in all its axially movable positions, there being a plurality of diameter differences between the stem and cooperative restriction-producing portions of the passage thereby variably restricting the passage under different axially-moved positions of the stem in the passage, said stem being subject to movement under pressure variations in the intake to decrease the conductive capacity of the restricting passage responsive to maximum pressure difference between the intake and crank-case and to increase the conductive capacity of the restricting passage responsive to minimum pressure difference between the intake and crank case, means for limiting the axial movement of said stem, said stem being free for lateral wobbling movements limited only by engagement of the stem with the walls of the restricted passage.

9. The structure defined in claim 8 in which the stem is vertically disposed and is weighted at its lower end so as to gravity bias the same in a downward direction.

10. In an engine having a compression chamber, a piston associated with the compression chamber, a lubricant-containing chamber separated from the compression chamber by said piston, and an intake duct for the compression chamber and in which duct there is maintained a varying pressure with respect to the lubricant-containing chamber under varying engine-operating conditions, of a ventilating system for said lubricant-containing chamber, said ventilating system comprising a ventilating passage between the air intake duct and said lubricant-containing chamber and a reciprocatory non-closing metering valve element located wholly within the confines of said ventilating passage in spaced relation to the junction of said intake duct and ventilating passage and being subject to and responsive to pressure variations in the intake duct to automatically reduce the effective area of said passage under increased pressure difference between the lubricant chamber and intake duct without closing the passage to passage of air in any of its positions, whereby to automatically regulate the rate of flow through said passage in response to pressure variations in the intake duct.

11. The combination with an internal combustion engine having a crank-case, and an intake wherein there is a varying degree of pressure with respect to that of the crank-case under operating conditions, of a crank-case ventilating system including a duct extending from the said intake to the crank-case and having a restricted passage, and a combined metering valve and clean-out device working in the restricted passage and subject to movement under pressure variations in the intake, said metering valve and clean-out device keeping the restricted passage free of foreign substance and open to passage of air in all of its axially moved positions and comprising a stem working axially through at least one end of the restricted passage, all parts of the stem that work in the restricted passage being of less diameter than that of any part of the restricted passage in which the stem operates and said stem being free for lateral wobbling movements in the restricted passage limited only by engagement of the stem with the walls of the restricted passage, there being a plurality of diameter differences between the stem and cooperating restriction producing portions of the restricted passage to thereby variably restrict said passage under axial movement of the stem, and means limiting axial movements of said stem.

12. The structure defined in claim 10 in which the metering valve element is mounted for limited axial reciprocating movements in the ventilating passage.

WILFRED W. LOWTHER.